(12) United States Patent
Tanimoto

(10) Patent No.: US 11,568,188 B2
(45) Date of Patent: *Jan. 31, 2023

(54) IMAGE FORMING APPARATUS

(71) Applicant: TOSHIBA TEC KABUSHIKI KAISHA, Tokyo (JP)

(72) Inventor: Koji Tanimoto, Tagata Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/723,255

(22) Filed: Apr. 18, 2022

(65) Prior Publication Data

US 2022/0245412 A1 Aug. 4, 2022

Related U.S. Application Data

(63) Continuation of application No. 17/016,213, filed on Sep. 9, 2020, now Pat. No. 11,334,776.

(51) Int. Cl.
*G06K 15/22* (2006.01)
*G06K 15/12* (2006.01)

(52) U.S. Cl.
CPC ....... *G06K 15/1214* (2013.01); *G06K 15/129* (2013.01)

(58) Field of Classification Search
CPC .......... G06K 15/1209; G06K 15/1214; G06K 15/1219; G06K 15/129
See application file for complete search history.

(56) References Cited

U.S. PATENT DOCUMENTS

| | | |
|---|---|---|
| 2005/0146593 A1 | 7/2005 | Yamazaki et al. |
| 2008/0012925 A1 | 1/2008 | Yamazaki et al. |
| 2008/0079025 A1 | 4/2008 | Inoue |
| 2009/0140658 A1 | 6/2009 | Jo et al. |
| 2009/0141113 A1 | 6/2009 | Yamazaki et al. |
| 2019/0384205 A1 | 12/2019 | Furuta |
| 2020/0150554 A1 | 5/2020 | Furuta |

FOREIGN PATENT DOCUMENTS

| | | |
|---|---|---|
| JP | 2009-119798 A | 6/2009 |
| JP | 2011-161908 A | 8/2011 |
| JP | 2015-101059 A | 6/2015 |
| JP | 2015-112856 A | 6/2015 |

*Primary Examiner* — Moustapha Diaby
(74) *Attorney, Agent, or Firm* — Foley & Lardner LLP

(57) ABSTRACT

An image forming apparatus includes a plurality of light emitting elements, a detector, a controller, and an image forming unit. The light emitting elements are arranged in at least one row. The detector is configured to detect a number of light emitting elements that emit light according to image data. The controller is configured to control a driving voltage for driving the light emitting elements based on the number of light emitting elements detected. The image forming unit is configured to form an image based on light emission of the light emitting elements according to the image data.

20 Claims, 14 Drawing Sheets

IMAGE FORMING APPARATUS

CROSS-REFERENCE TO RELATED APPLICATION

This application is a continuation of U.S. patent application Ser. No. 17/016,213, filed Sep. 9, 2020, the entire contents of which are incorporated herein by reference.

FIELD

Exemplary embodiments described herein relate to an image forming apparatus.

BACKGROUND

Electrophotographic printers (hereinafter, printers) including a print head are widespread. The print head includes a plurality of light emitting elements such as light emitting diode (LED) or organic light emitting diode (OLED). For example, the print head is provided with light emitting elements corresponding to 15400 pixels, a direction in which light emitting elements are arranged corresponds to a main scanning direction, and a direction orthogonal to the main scanning direction corresponds to a sub-scanning direction. The printer exposes a photoreceptor drum with light emitted from the plurality of light emitting elements, and prints an image corresponding to a latent image formed in the photoreceptor drum on a sheet which is a recording paper sheet.

DETAILED DESCRIPTION

Figure 1:
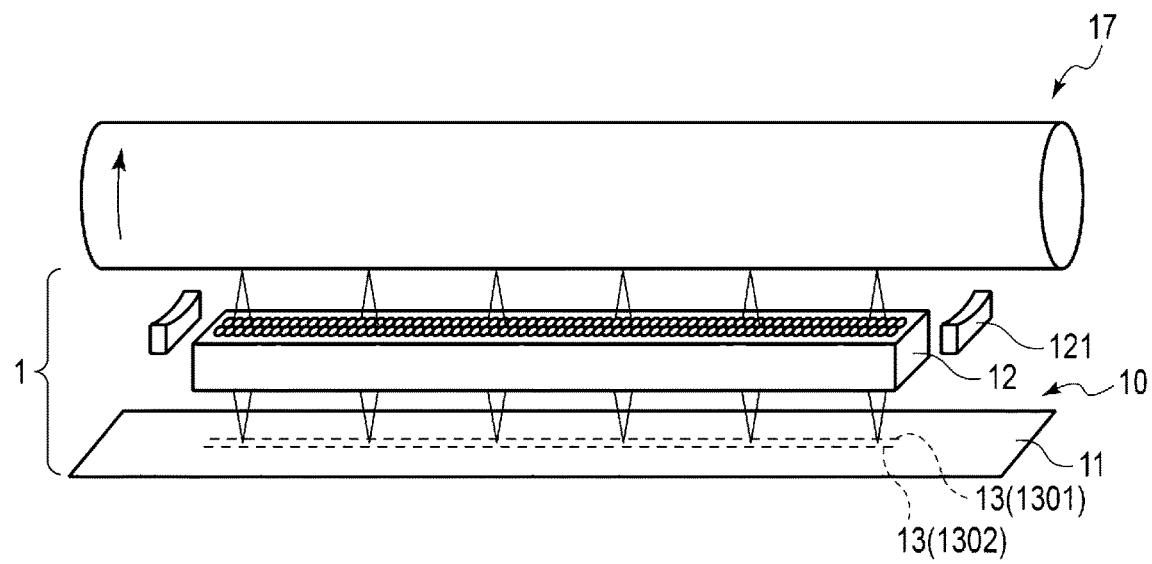
FIG. 1 is a view illustrating an example of a positional relationship between a photoreceptor drum and a print head in an image forming apparatus according to an embodiment.

An image forming apparatus according to an embodiment includes a print head, a detection section, a controller, and a power source section. The print head includes one or a plurality of light emitting element rows composed of a plurality of light emitting elements. The detection section detects the number of light emitting elements that emit light according to image data. The controller controls a driving voltage for driving the light emitting elements based on a detection result. The power source section supplies the driving voltage to the print head.

Hereinafter, an example of the image forming apparatus according to the embodiment will be described with reference to the drawings. In each drawing, the same reference numerals will be given to the same configurations. The image forming apparatus is a printer, a copying machine, or a multifunctional peripheral (MFP). In the embodiment, an image forming apparatus corresponding to the MFP will be described.

Configuration of Print Head

An example of the configuration of the print head applied to the image forming apparatus according to the embodiment will be described with reference to FIGS. 1 through 8.

FIG. 1 is a view illustrating an example of a positional relationship between a photoreceptor drum and a print head applied to an image forming apparatus according to an embodiment.

An image forming apparatus 100 includes a photoreceptor drum 17 and a print head 1 illustrated in FIG. 1. The print head 1 is disposed so as to face the photoreceptor drum 17. The photoreceptor drum 17 rotates in a direction of an arrow illustrated in FIG. 1. A rotational direction of the photoreceptor drum 17 is called a sub-scanning direction, and a direction orthogonal to the sub-scanning direction is called a main scanning direction. The photoreceptor drum 17 is uniformly charged by a charging device (e.g., charger) and exposed with the light from the print head 1, and a potential (e.g., voltage potential) of the exposed part decreases. In other words, the image forming apparatus 100 controls the light emission of the print head 1 and forms an electrostatic latent image on the photoreceptor drum 17. Controlling the light emission of the print head 1 is controlling the timing of light emission and light-off (non-light emission) of the print head 1.

The print head 1 includes a light emitting section 10 and a rod lens array 12. The light emitting section 10 includes a transparent board 11. For example, the transparent board 11 is a glass board that transmits light. A plurality of light emitting element rows 13 composed of a plurality of light emitting elements 131 such as LEDs or OLEDs are formed on the transparent board 11.

Figure 2:
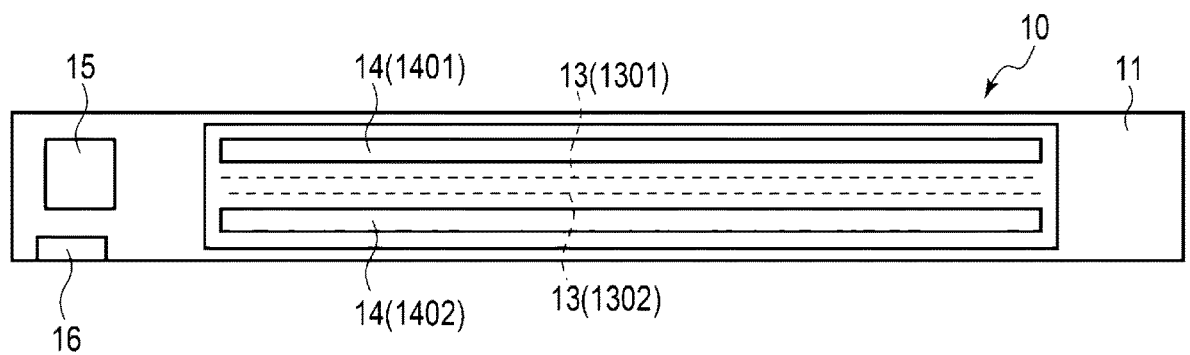
FIG. 2 is a view illustrating an example of a transparent board included in the print head according to the embodiment.

As illustrated in FIG. 1, two rows of a first light emitting element row 1301 and a second light emitting element row 1302, are arranged in parallel. The rod lens array 12 collects light from each light emitting element 131 of the two rows of the first light emitting element row 1301 and the second light emitting element row 1302 on the photoreceptor drum 17. Accordingly, an image line corresponding to the light emission of the light emitting elements 131 is formed on the photoreceptor drum 17. In the embodiment, a case where the print head 1 includes a plurality of light emitting element rows 13 will be described, but it is also possible for the print head 1 to include only a single light emitting element row 13. Further, the print head 1 may also include a gap spacer 121. The gap spacer 121 maintains a predetermined distance between the transparent board 11 and the photoreceptor drum 17. FIG. 2 is a view illustrating an example of the transparent board included in the print head according to the embodiment.

As illustrated in FIG. 2, at a center portion of the transparent board 11, two light emitting element rows 13 (e.g., the first light emitting element row 1301 and the second light emitting element row 1302) are formed along a longitudinal direction of the transparent board 11. In the vicinity of the light emitting element row 13, driving circuit rows 14 (e.g., a first driving circuit row 1401 and a second driving circuit row 1402) for driving (e.g., causing light emission of) each light emitting element are formed. Hereinafter, "driving" is referred to as "DRV". In FIG. 2, the DRV circuit rows 14 for driving (e.g., causing light emission of) the light emitting elements 131 are disposed on both sides of the two light emitting element rows 13, but the DRV circuit rows 14 may be arranged on one side.

An integrated circuit (IC) 15 is disposed at an end portion of the transparent board 11. In addition, the transparent board 11 includes a connector 16. The connector 16 electrically connects the print head 1 to a control system of a printer, a copying machine, or a multifunctional peripheral. This connection enables electric power supply, head control, image data transfer, and the like. A board for sealing the light emitting element rows 13, the DRV circuit rows 14, and the like so as not to come into contact with outside air is attached to the transparent board 11. Furthermore, when it is difficult to mount the connector on the transparent board, a flexible printed circuit (FPC) may be connected to the transparent board and electrically connected to the control system.

Figure 3:
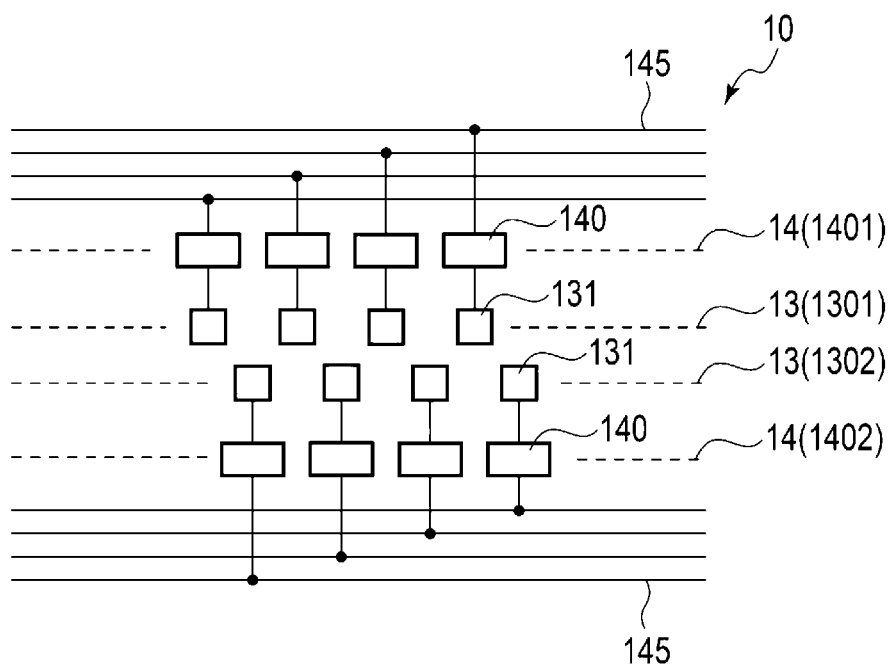
FIG. 3 is a view illustrating an example of a layout of light emitting elements and driving circuits of the print head according to the embodiment.

FIG. 3 is a view illustrating an example of a layout of the light emitting elements and the driving circuits of the print head according to the embodiment.

As illustrated in FIG. 3, the light emitting section 10 of the print head 1 includes both the light emitting element rows 13 in which the plurality of light emitting elements 131 are arranged and the driving circuit rows 14 in which the plurality of driving circuits 140 are arranged. The driving circuits 140 cause the light emitting elements 131 connected to the respective driving circuits 140 to emit light based on signals (e.g., a sample and hold signal 21, a light emission level signal 22, a light emission ON signal 26, and a light emission OFF signal 27, which will be described later) of a wiring 145.

Figure 4:
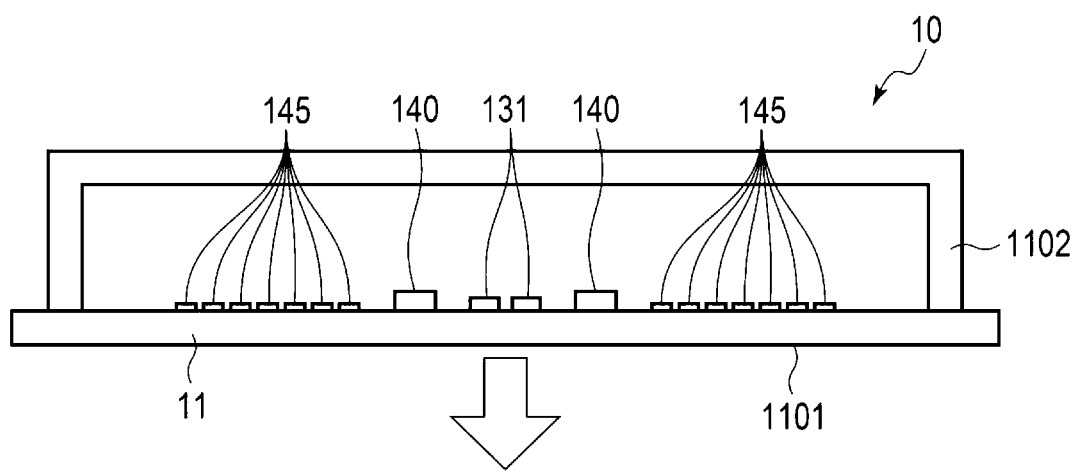
FIG. 4 is a view illustrating an example of a section of the transparent board of the print head according to the embodiment.

FIG. 4 is a view illustrating an example of a section of the transparent board of the print head according to the embodiment.

As illustrated in FIG. 4, the light emitting section 10 of the print head 1 includes the plurality of light emitting elements 131, the plurality of driving circuits 140, and the wirings 145 which are disposed to oppose a reference surface 1101 of the transparent board 11. In addition, the light emitting section 10 includes a sealing glass 1102. The plurality of light emitting elements 131, the plurality of driving circuits 140, and the wirings 145 are disposed in the space surrounded by the transparent board 11 and the sealing glass 1102. The light from the light emitting element 131 passes through the transparent board 11 and is emitted toward the photoreceptor drum 17.

Figure 5:
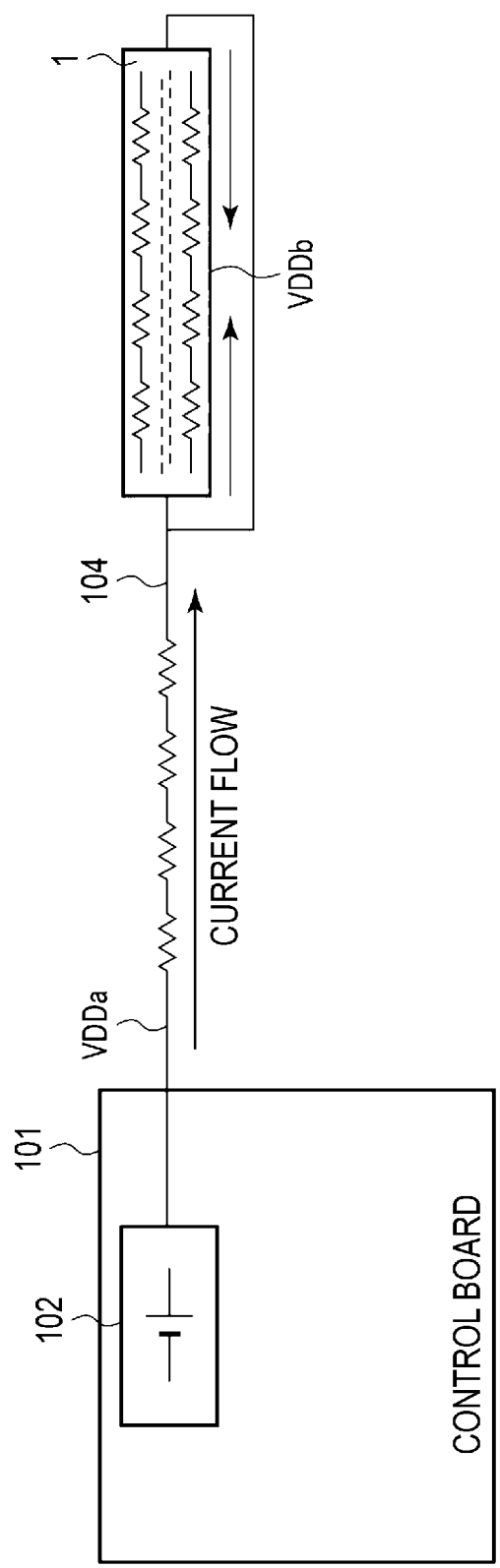
FIG. 5 is a view illustrating a connection example between a control board and the print head according to the embodiment.

FIG. 5 is a view illustrating a connection example between the control board and the print head according to the embodiment.

As illustrated in FIG. 5, the image forming apparatus 100 includes a control board 101, and the control board 101 includes a power source section 102. The power source section 102 supplies a power source voltage VDDa to both ends of the print head 1 via a harness 104. The relationship between the number of light emitting elements 131 that emit light and a light quantity decrease rate will be described later.

Figure 6:
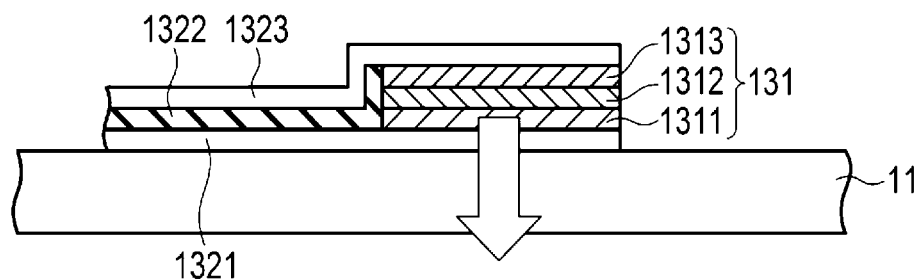
FIG. 6 is a view describing an example of a structure of the light emitting element of the print head according to the embodiment.

FIG. 6 is a diagram describing an example of a structure of the light emitting element of the print head according to the embodiment. In FIG. 6, the sealing glass 1102 is omitted.

For example, the light emitting element 131 is an organic electroluminescence (organic EL). As illustrated in FIG. 6, the light emitting element 131 includes a hole transport layer 1311, a light emitting layer 1312, and an electron transport layer 1313, and is in contact with and sandwiched between an electrode (+) 1321 and an electrode (−) 1323 insulated by an insulating layer 1322. In the first embodiment, for example, the light emitting layer 1312 is an organic EL. The electrode (−) 1323 has a structure for reflecting light emitted from the light emitting layer 1312. With this structure, the light emitted from the light emitting layer 1312 is output to the transparent board 11 side.

Figure 7:
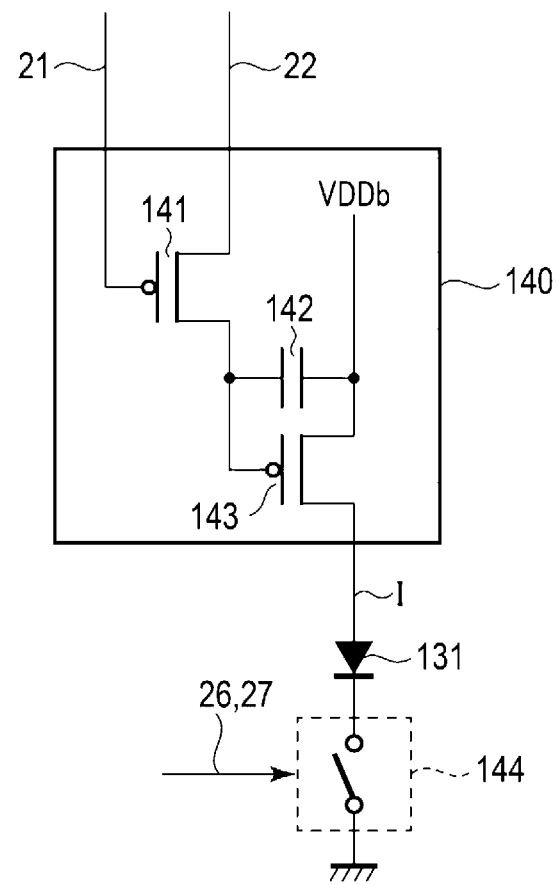
FIG. 7 is a schematic diagram illustrating an example of a circuit configuration including a DRV circuit for driving the light emitting element according to the embodiment, the light emitting element that emits light by the DRV circuit, and a switch that switches current supply to the light emitting element.

FIG. 7 is a schematic diagram illustrating an example of a circuit configuration including the DRV circuit for driving the light emitting element according to the embodiment, the light emitting element that emits light by the DRV circuit, and a switch that switches current supply to the light emitting element.

The DRV circuit is composed of a low-temperature polysilicon thin film transistor. The sample and hold signal 21 becomes an "L" level when light emission intensity of the light emitting element 131 connected to the DRV circuit 140 is changed. When the sample and hold signal 21 becomes an "L" level, a voltage of a capacitor 142 changes according to the voltage of the light emission level signal 22. In other words, the capacitor 142 holds a potential that changes according to correction data which will be described below.

When the sample and hold signal 21 becomes an "H" level, the voltage of the capacitor 142 is held. Even when the voltage of the light emission level signal 22 changes, the voltage level of the capacitor 142 does not change. A current according to the voltage held in the capacitor 142 flows through the light emitting element 131 connected to a signal line I of the DRV circuit 140. In other words, the light emitting element 131 emits light according to the potential of the capacitor. A predetermined light emitting element 131 is selected from the plurality of light emitting elements 131 included in the light emitting element row 13 by the sample and hold signal 21, the light emission intensity is determined by the light emission level signal 22, and the light emission intensity can be maintained.

Figure 8:
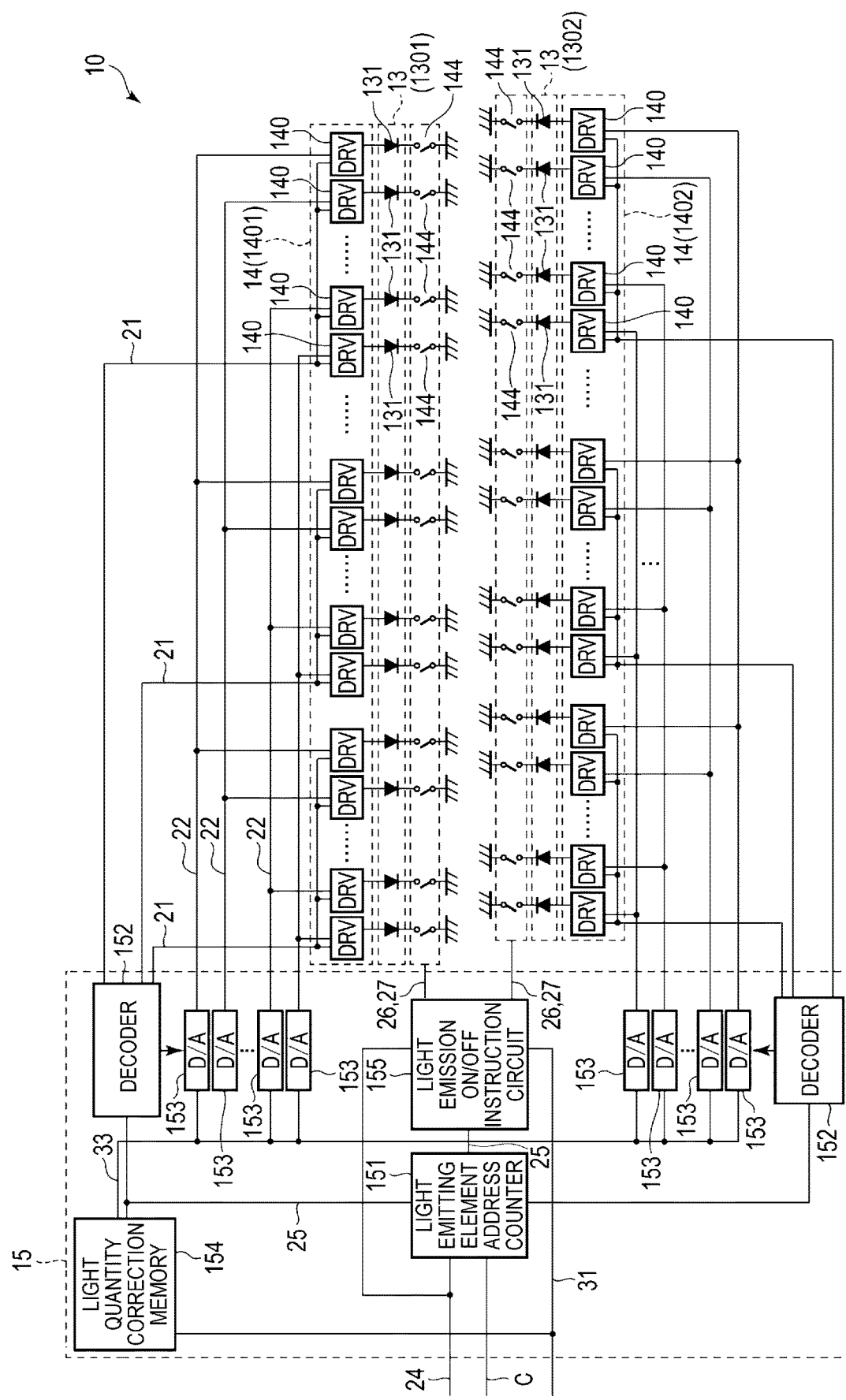
FIG. 8 is a diagram illustrating an example of a head circuit block of the print head according to the embodiment.

Further, a switch 144 is connected to the DRV circuit 140. The switch 144 switches between supply and non-supply (ON and OFF of current supply) of current supply to the light emitting element 131. When the switch 144 is closed by the light emission ON signal 26, a current flows through the light emitting element 131 and the light emitting element 131 emits light. When the switch 144 is opened by the light emission OFF signal 27, no current flows through the light emitting element 131 and the light emitting element 131 is turned off. FIG. 8 is a diagram illustrating an example of a head circuit block of the print head according to the embodiment.

As illustrated in FIG. 8, the light emitting section 10 includes the head circuit block including the IC 15. The IC 15 includes a light emitting element address counter 151, a decoder 152, a digital to analog (D/A) conversion circuit 153, a light quantity correction memory 154, a light emission ON or OFF instruction circuit 155, and the like. The light emitting element address counter 151, the decoder 152, the D/A conversion circuit (e.g., converter) 153, the light quantity correction memory 154, and the light emission ON or OFF instruction circuit 155 supply the sample and hold signal 21, the light emission level signal 22, the light emission ON signal 26, and the light emission OFF signal 27 which are described in advance to the DRV circuit 140 and the like.

As illustrated in FIG. 8, the light emitting elements 131 are respectively connected to the DRV circuits 140. Each of the individual DRV circuits 140 supplies individual currents to corresponding one of the individual light emitting elements 131. The D/A conversion circuit 153 is connected to the first DRV circuit row 1401 connected to the first light emitting element row 1301. Similarly, the D/A conversion circuit 153 is connected to the DRV circuit row 1402 connected to the second light emitting element row 1302.

The light quantity correction memory 154 stores the correction data according to the current that flows through each light emitting element 131. A horizontal synchronizing signal 24 and an image data writing clock C are input to the light emitting element address counter 151 via the connector 16. The horizontal synchronizing signal 24 resets a count value of the light emitting element address counter 151. The light emitting element address counter 151 outputs a light emitting element address signal 25 synchronized with the image data writing clock C.

Image data 31 and the light emitting element address signal 25 output from the light emitting element address counter 151 are input to the light quantity correction memory 154. The light emitting element address signal 25 output from the light emitting element address counter 151 is input to the decoder 152. The decoder 152 outputs the sample and hold signal 21 corresponding to the light emitting element 131 designated by the light emitting element address signal 25. The light quantity correction memory 154 outputs correction data 33 corresponding to the light emitting element 131 designated by the light emitting element address signal 25. The correction data 33 output from the light quantity correction memory 154 is input to the D/A conversion circuit 153. The D/A conversion circuit 153 outputs the voltage of the light emission level signal 22 based on the correction data 33. The voltage of the light emission level signal 22 is sampled and held in the capacitor 142 of the DRV circuit 140. The sampling and holding in the capacitor 142 are periodically performed.

Configuration of Image Forming Apparatus

Figure 9:
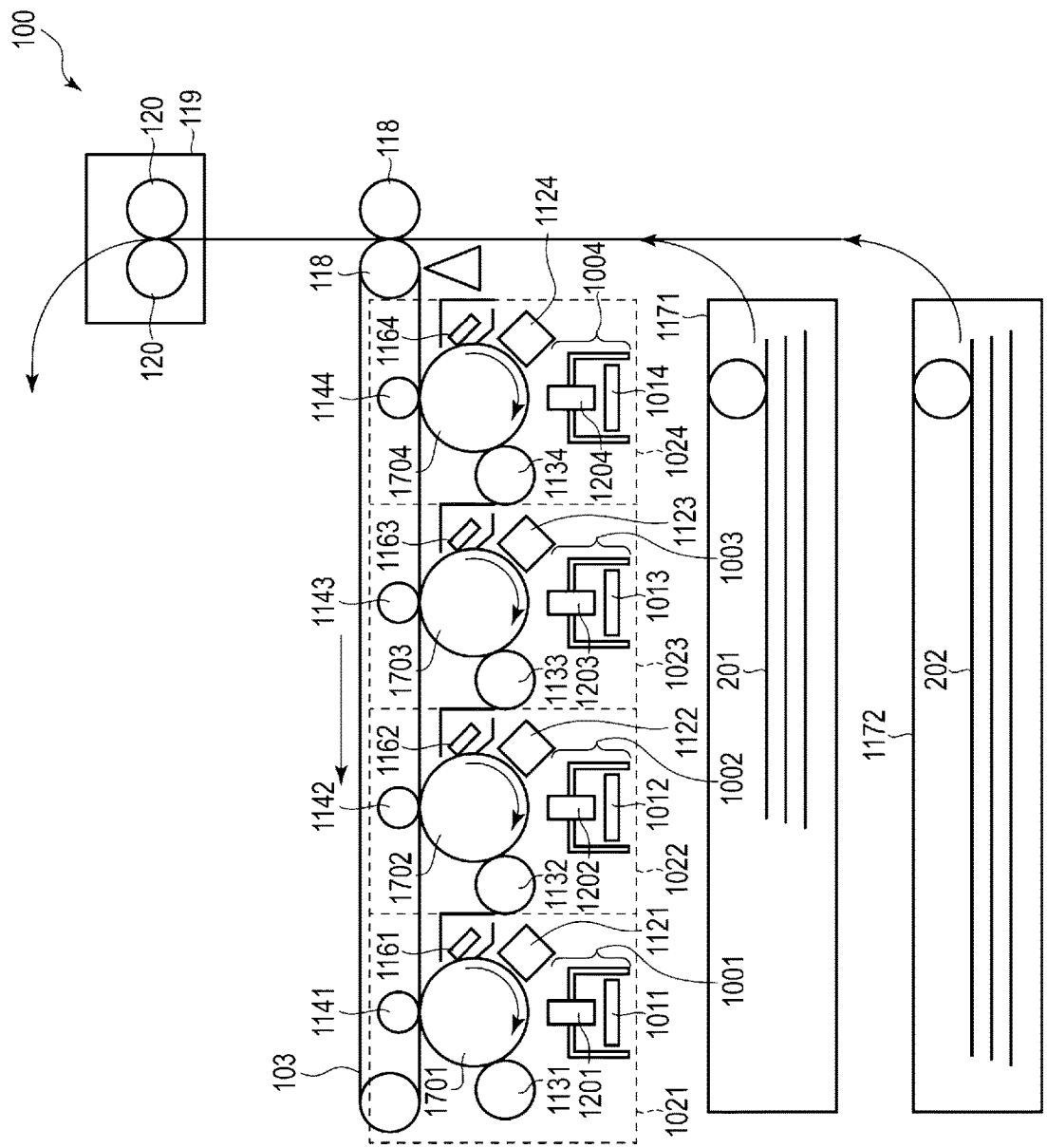
FIG. 9 is a view illustrating an example of an image forming apparatus to which a print head according to a first embodiment is applied.

FIG. 9 is a diagram illustrating an example of an image forming apparatus to which the print head according to the first embodiment is applied. FIG. 9 illustrates an example of a quadruple tandem-type color image forming apparatus, but the print head 1 of the embodiment can also be applied to a monochrome image forming apparatus.

As illustrated in FIG. 9, for example, an image forming apparatus 100 includes an image forming unit 1021 that forms a yellow (Y) image, an image forming unit 1022 that forms a magenta (M) image, an image forming unit 1023 that forms a cyan (C) image, and an image forming unit 1024 that forms a black (K) image. The image forming units 1021, 1022, 1023, and 1024 form yellow, cyan, magenta, and black images, respectively, and transfer the images to a transfer belt 103. Accordingly, a full-color image is formed on the transfer belt 103.

The image forming unit 1021 that forms a yellow (Y) image includes a print head 1001, and the print head 1001 includes a light emitting section 1011 and a rod lens array 1201. Furthermore, the image forming unit 1021 includes an electrostatic charger 1121, the print head 1001, a developing device (e.g., a developer) 1131, a transfer roller 1141, and a cleaner 1161 around a photoreceptor drum 1701. The print head 1001 corresponds to the print head 1, the light emitting section 1011 corresponds to the light emitting section 10, the rod lens array 1201 corresponds to the rod lens array 12, the photoreceptor drum 1701 corresponds to the photoreceptor drum 17, and the description thereof will be omitted.

The image forming unit 1022 that forms a magenta (M) image includes a print head 1002, and the print head 1002 includes a light emitting section 1012 and a rod lens array 1202. Furthermore, the image forming unit 1022 includes an electrostatic charger 1122, the print head 1002, a developing device (e.g., a developer) 1132, a transfer roller 1142, and a cleaner 1162 around a photoreceptor drum 1702. The print head 1002 corresponds to the print head 1, the light emitting section 1012 corresponds to the light emitting section 10, the rod lens array 1202 corresponds to the rod lens array 12, the photoreceptor drum 1702 corresponds to the photoreceptor drum 17, and the description thereof will be omitted.

The image forming unit 1023 that forms a cyan (C) image includes a print head 1003, and the print head 1003 includes a light emitting section 1013 and a rod lens array 1203. Furthermore, the image forming unit 1023 includes an electrostatic charger 1123, the print head 1003, a developing device (e.g., a developer) 1133, a transfer roller 1143, and a cleaner 1163 around a photoreceptor drum 1703. The print head 1003 corresponds to the print head 1, the light emitting section 1013 corresponds to the light emitting section 10, the rod lens array 1203 corresponds to the rod lens array 12, the photoreceptor drum 1703 corresponds to the photoreceptor drum 17, and the description thereof will be omitted.

The image forming unit 1024 that forms a black (K) image includes a print head 1004, and the print head 1004 includes a light emitting section 1014 and a rod lens array 1204. Furthermore, the image forming unit 1024 includes an electrostatic charger 1124, the print head 1004, a developing device (e.g., a developer) 1134, a transfer roller 1144, and a cleaner 1164 around a photoreceptor drum 1704. The print head 1004 corresponds to the print head 1, the light emitting section 1014 corresponds to the light emitting section 10, the rod lens array 1204 corresponds to the rod lens array 12, the photoreceptor drum 1704 corresponds to the photoreceptor drum 17, and the description thereof will be omitted.

The electrostatic chargers 1121, 1122, 1123, and 1124 uniformly charge the photoreceptor drums 1701, 1702, 1703, and 1704, respectively. The print heads 1001, 1002, 1003, and 1004 expose the photoreceptor drums 1701, 1702, 1703, and 1704, respectively, by the light emission of the light emitting elements 131 of the first light emitting element row 1301 and the second light emitting element row 1302, and form electrostatic latent images on the photoreceptor drums 1701, 1702, 1703, and 1704. The developing device 1131, the developing device 1132, the developing device 1133, and the developing device 1134 respectively stick (develop) a yellow toner, a magenta toner, a cyan toner, and a black toner on the electrostatic latent image parts of the respective photoreceptor drums 1701, 1702, 1703, and 1704.

The transfer rollers 1141, 1142, 1143, and 1144 transfer the toner images developed on the photoreceptor drums 1701, 1702, 1703, and 1704 to the transfer belt 103. The cleaners 1161, 1162, 1163, and 1164 clean toners which are not transferred and left on the photoreceptor drums 1701, 1702, 1703, and 1704, and are in a standby state for the next image formation.

A paper sheet (e.g., an image forming medium) 201 having a first size (e.g., a small size) is stored in a paper sheet cassette 1171 which is a paper sheet supply unit. A paper sheet (image forming medium) 202 having a second size (e.g., a large size) is stored in a paper sheet cassette 1172 which is a paper sheet supply unit.

A toner image is transferred to the paper sheet 201 or 202, which is picked up from the paper sheet cassette 1171 or 1172, from the transfer belt 103 by a transfer roller pair 118 which is a transfer unit. The paper sheet 201 or 202 to which the toner image is transferred is heated and pressurized by a fixing roller 120 of a fixing section 119. The toner image is firmly fixed on the paper sheet 201 or 202 due to heating and pressurizing by the fixing roller 120. By repeating the above-described process operation, the image forming operation is continuously performed.

Figure 10:
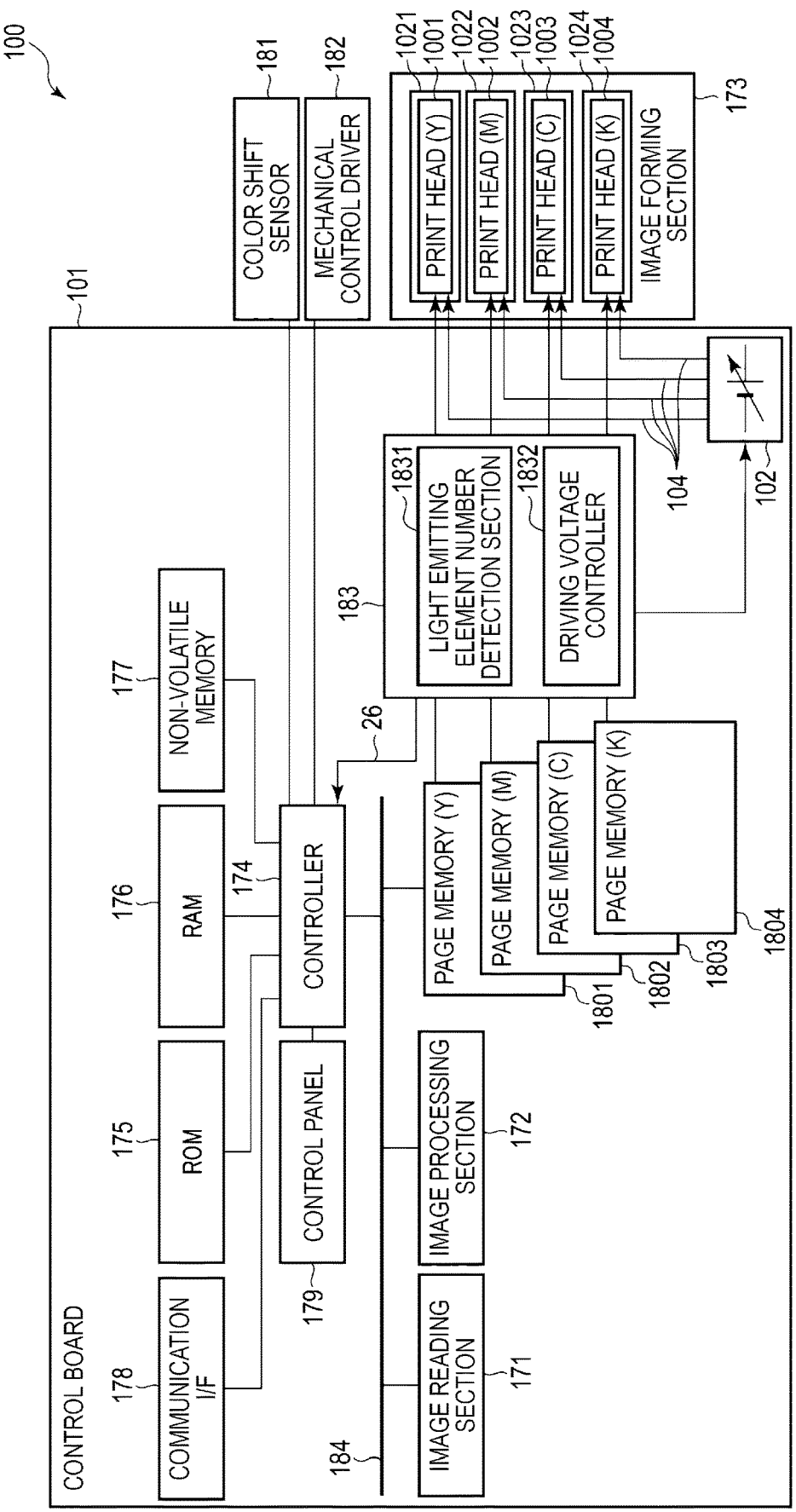
FIG. 10 is a block diagram illustrating an example of a control system of the image forming apparatus according to the embodiment.

FIG. 10 is a block diagram illustrating an example of a control system of the image forming apparatus according to the embodiment.

As illustrated in FIG. 10, the image forming apparatus 100 includes the control board 101. The control board 101 includes the power source section 102, an image reading section 171, an image processing section 172, an image forming section 173, a controller 174, a read only memory (ROM) 175, a random access memory (RAM) 176, a non-volatile memory 177, a communication I/F 178, a control panel 179, page memories 1801, 1802, 1803, and 1804, a light emission controller 183, and an image data bus 184. Furthermore, the image forming apparatus 100 includes a color shift sensor 181, and a mechanical control driver 182. The image forming section 173 includes image forming units 1021, 1022, 1023, and 1024. The power source section 102 supplies a driving voltage to both ends of the print heads 1001, 1002, 1003, and 1004 of the image forming section 173 via the harness 104.

The ROM 175, the RAM 176, the non-volatile memory 177, the communication I/F 178, the control panel 179, the color shift sensor 181, the mechanical control driver 182, and the light emission controller 183 are connected to the controller 174. The image reading section 171, the image processing section 172, the controller 174, the page memories 1801, 1802, 1803, and 1804 are connected to the image data bus 184. The page memories 1801, 1802, 1803, and 1804 output Y, M, C, and K image data 31 respectively. The light emission controller 183 is connected to the page memories 1801, 1802, 1803, and 1804, and the Y image data 31 from the page memory 1801, the M image data 31 from the page memory 1802, the C image data 31 from the page memory 1803, and the K image data 31 from the page memory 1804 are input. The print heads 1001, 1002, 1003, and 1004 are connected to the light emission controller 183 so as to correspond to the respective pieces of the image data 31. The light emission controller 183 inputs the respective pieces of the image data 31 into the print heads 1001, 1002, 1003, and 1004 corresponding to the respective pieces of the image data 31.

The controller 174 includes one or more processors and controls operations such as image reading, image processing, and image formation according to various programs stored in at least one of the ROM 175 and the non-volatile memory 177.

Further, the controller 174 inputs image data of a test pattern onto the page memories 1801, 1802, 1803, and 1804 and forms the test pattern. The color shift sensor 181 detects the test pattern formed on the transfer belt 103 and outputs a detection signal to the controller 174. The controller 174 can recognize a positional relationship of test patterns of each color from the input of the color shift sensor 181. Furthermore, the controller 174 selects the paper sheet cassette 1171 or 1172 for feeding paper sheets on which an image is to be formed through the mechanical control driver 182.

The ROM 175 stores various programs or the like necessary for the control of the controller 174. The various programs include a light emission control program of the print head. The light emission control program is a program for controlling the timing of light emission and light-off (non-light emission) based on the image data.

The RAM 176 temporarily stores data necessary for the control of the controller 174. The non-volatile memory 177 stores a part or all of various programs, various parameters, and the like.

The mechanical control driver 182 controls an operation of a motor or the like necessary for printing according to the instruction of the controller 174. The communication I/F 178 outputs various pieces of information to the outside and also inputs various pieces of information from the outside. For example, the communication I/F 178 acquires image data including a plurality of image lines. The image forming apparatus 100 prints the image data acquired via the communication I/F 178 by the print function. The control panel 179 receives operation inputs from a user and a service personnel.

The image reading section 171 optically reads the image of a document, acquires the image data including the plurality of image lines, and outputs the image data to the image processing section 172. The image processing section 172 executes various types of image processing such as correction with respect to the image data input via the communication I/F 178 or the image data from the image reading section 171. The page memories 1801, 1802, 1803, and 1804 store the image data processed by the image processing section 172. The controller 174 edits the image data on the page memories 1801, 1802, 1803, and 1804 so as to match a print position or the print head. The image forming section 173 forms an image based on the image data stored in the page memories 1801, 1802, 1803, and 1804. In other words, the image forming section 173 forms an image based on the light emission (light emission and light-off state) of each light emitting element 131 according to the image data.

The light emission controller 183 includes one or more processors and controls the light emission of the light emitting element 131 based on the image data according to various programs stored in at least one of the ROM 175 and the non-volatile memory 177. The light emission controller 183 includes a light emitting element number detection section (e.g., a detector) 1831 and a driving voltage controller 1832. The light emitting element number detection section 1831 detects the number of light emitting elements 131 that emit light according to the image data before the light emitting element 131 emits light according to the image data. For example, the light emitting element number detection section 1831 detects a proportion of the light emitting elements that emit light in units of one or a plurality of light emitting element rows. While a case where all of the light emitting elements 131 of the light emitting element row 13 (the first light emitting element row 1301 and the second light emitting element row 1302) emit light is defined as 100%, the light emitting element number detection section 1831 detects whether or not the proportion of the light emitting elements that emit light is equal to or less than 20%, whether or not the proportion is equal to or less than 40%, whether or not the proportion is equal to or less than 60%, and whether or not the proportion is equal to or less than 80%. In addition, the detection proportion is an example, and any proportion can be applied. In addition, when the light emission timing (e.g., phase) of the light emitting element 131 differs depending on the disposition position in the main scanning direction, the light emitting element number detection section 1831 may detect the number of light emitting elements 131 that emit light simultaneously from the image data and the disposition position of the light emitting elements 131 that emit light. Furthermore, the proportion of the light emitting elements that emit light may be detected from the number of light emitting elements 131 that emit light at the same time.

The driving voltage controller 1832 controls a driving voltage for driving the light emitting element 131 based on the detection result of the number of light emitting elements that emit light. In other words, the driving voltage controller 1832 controls the driving voltage supplied to both ends of the print head 1 from the power source section 102 based on the detection result of the number of light emitting elements that emit light. For example, the driving voltage controller 1832 changes (increases or decreases) the driving voltage supplied to the print head 1 based on the proportion of the light emitting elements that emit light.

Driving Voltage Control

Figure 11:
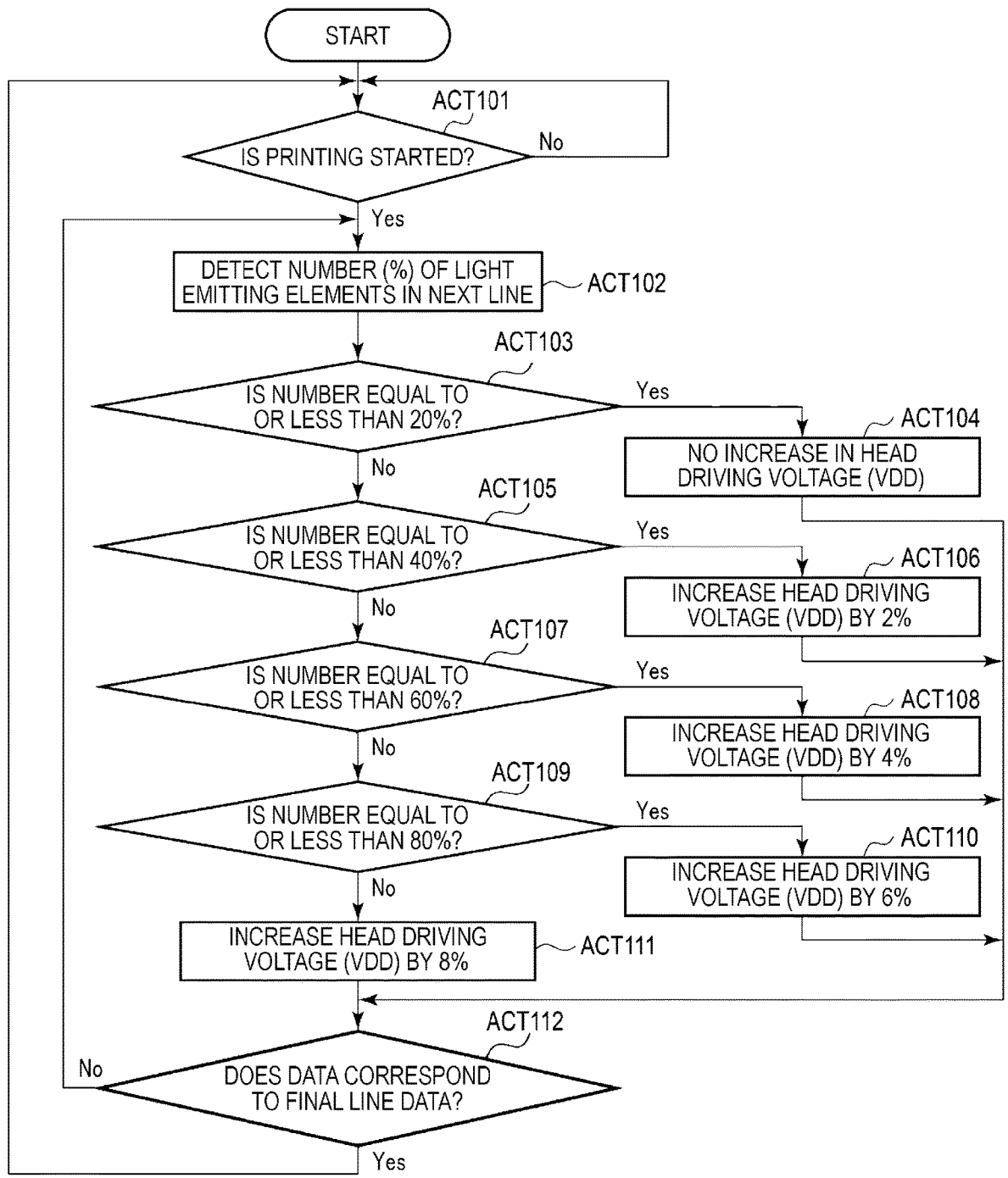
FIG. 11 is a flowchart illustrating an example of driving voltage control by the image forming apparatus according to the embodiment.

FIG. 11 is a flowchart illustrating an example of driving voltage control by the image forming apparatus according to the embodiment.

The communication interface 178 receives the image data and outputs the received image data. Otherwise, the image reading section 171 reads the document image and outputs the read image data. The controller 174 executes printing based on the image data (ACT 101, YES).

For example, when the image data corresponding to each color is received (that is, in a case of color printing), the image processing section 172 converts the image data corresponding to each color into raster data, and loads the converted raster data to the page memories 1801, 1802, 1803, and 1804. The page memories 1801, 1802, 1803, and 1804 output the image data corresponding to one line.

The light emitting element number detection section 1831 detects the number of light emitting elements 131 that emit light based on the image data corresponding to one line (ACT 102). In other words, the light emitting element number detection section 1831 detects the number of light emitting elements 131 that correspond to each color and emit light. Further, the driving voltage controller 1832 controls the driving voltage for driving the light emitting element 131 based on the detection result of the number of light emitting elements 131 that emit light (ACT 103 to ACT 111).

For example, when the proportion of the light emitting elements 131 that emit light is equal to or less than 20% (first proportion) (ACT 103, YES), the driving voltage controller 1832 controls the driving voltage to the reference voltage (VDD) and supplies the reference voltage. When the driving voltage is already controlled to the reference voltage, the driving voltage controller 1832 does not change the driving voltage, and when the driving voltage is controlled to a driving voltage higher than the reference voltage, the driving voltage controller 1832 decreases the driving voltage to the reference voltage (ACT 104).

When the proportion of the light emitting elements 131 that emit light exceeds 20% (ACT 103, NO) and is equal to or less than 40% (second proportion) (ACT 105, YES), the driving voltage controller 1832 changes the driving voltage to a first driving voltage which is higher than the reference voltage by 2%, and supplies the first driving voltage (ACT 106).

When the proportion of the light emitting elements 131 that emit light exceeds 40% (ACT 105, NO) and is equal to or less than 60% (third proportion) (ACT 107, YES), the driving voltage controller 1832 changes the driving voltage to a second driving voltage which is higher than the reference voltage by 4%, and supplies the second driving voltage (ACT 108).

When the proportion of the light emitting elements 131 that emit light exceeds 60% (ACT 107, NO) and is equal to or less than 80% (fourth proportion) (ACT 109, YES), the driving voltage controller 1832 changes the driving voltage to a third driving voltage which is higher than the reference voltage by 6%, and supplies the third driving voltage (ACT 110).

When the proportion of the light emitting elements 131 that emit light exceeds 80% (ACT 109, NO), the driving voltage controller 1832 controls the driving voltage to a fourth driving voltage which is higher than the reference voltage by 8%, and supplies the fourth driving voltage (ACT 111).

The light emission controller 183 repeats ACT 102 to ACT 111 from image data corresponding to a head line to image data corresponding to a final line, and finishes the light emission control based on the image data corresponding to the final line (ACT 112, YES). When there is image forming processing for the next page, the light emission control based on the image data for the next page is executed, and when there is no image forming processing for the next page, the light emission control is ended.

Figure 12:
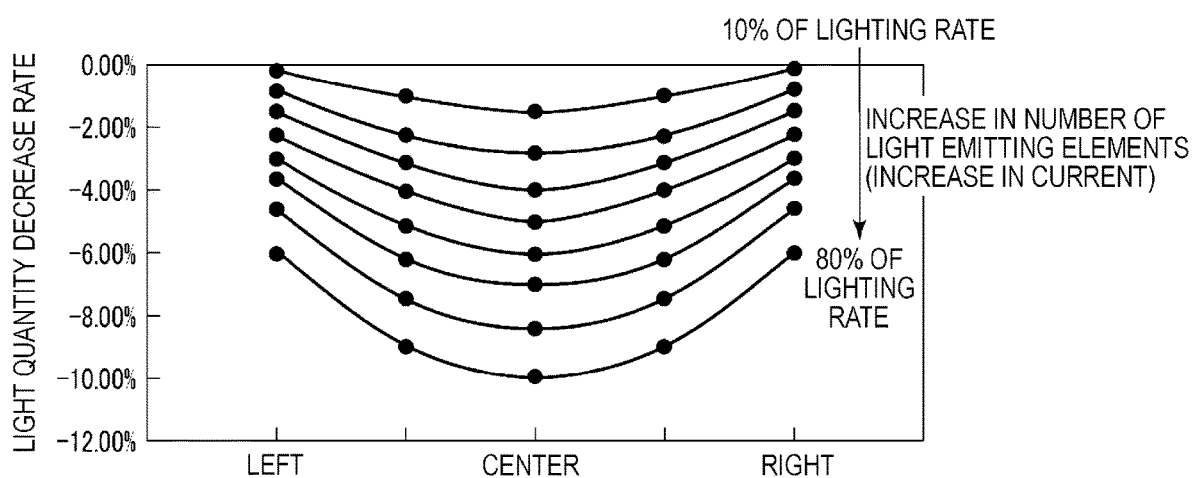
FIG. 12 is a diagram illustrating a relationship between the number of light emitting elements that emit light and a light quantity decrease rate in an optical head of the image forming apparatus according to the embodiment.

FIG. 12 is a non-application example of the driving voltage control according to the embodiment, and is illustrates a relationship between the number of light emitting elements that emit light and the light quantity decrease rate.

In FIG. 5, a connection example between the control board and the print head was described. The power source section 102 illustrated in FIG. 5 supplies the power source voltage VDDa to both ends of the print head 1 via the harness 104. When the current increases as the number of light emitting elements 131 that emit light increases, a voltage drop occurs in the harness 104 and the wiring in the print head 1. As a result, the power source voltage VDDa supplied from the power source section 102 drops to a power source voltage VDDb in the print head 1. The voltage drop in the wiring in the print head 1 becomes large, and the rate of light quantity decrease at the center portion of the light emitting element row 13 of the print head 1 becomes high. The higher the lighting rate, the higher the rate of light quantity decrease. The influence of this phenomenon on an image differs between the main scanning direction and the sub-scanning direction. As illustrated in FIG. 12, the light quantity decrease (change) in the main scanning direction is smooth at any lighting rate. Therefore, the image density change due to the light quantity change in the main scanning direction is inconspicuous. Meanwhile, since the light quantity change in units of lines depends on the number of light emitting elements in that line, when a line with a small number of light emitting elements and a line with a large number of light emitting elements are adjacent to each other, a rapid light quantity change will occur in the sub-scanning direction. For example, when a light quantity difference between the lines is equal to or greater than 3%, a density difference becomes noticeable.

Figure 13:
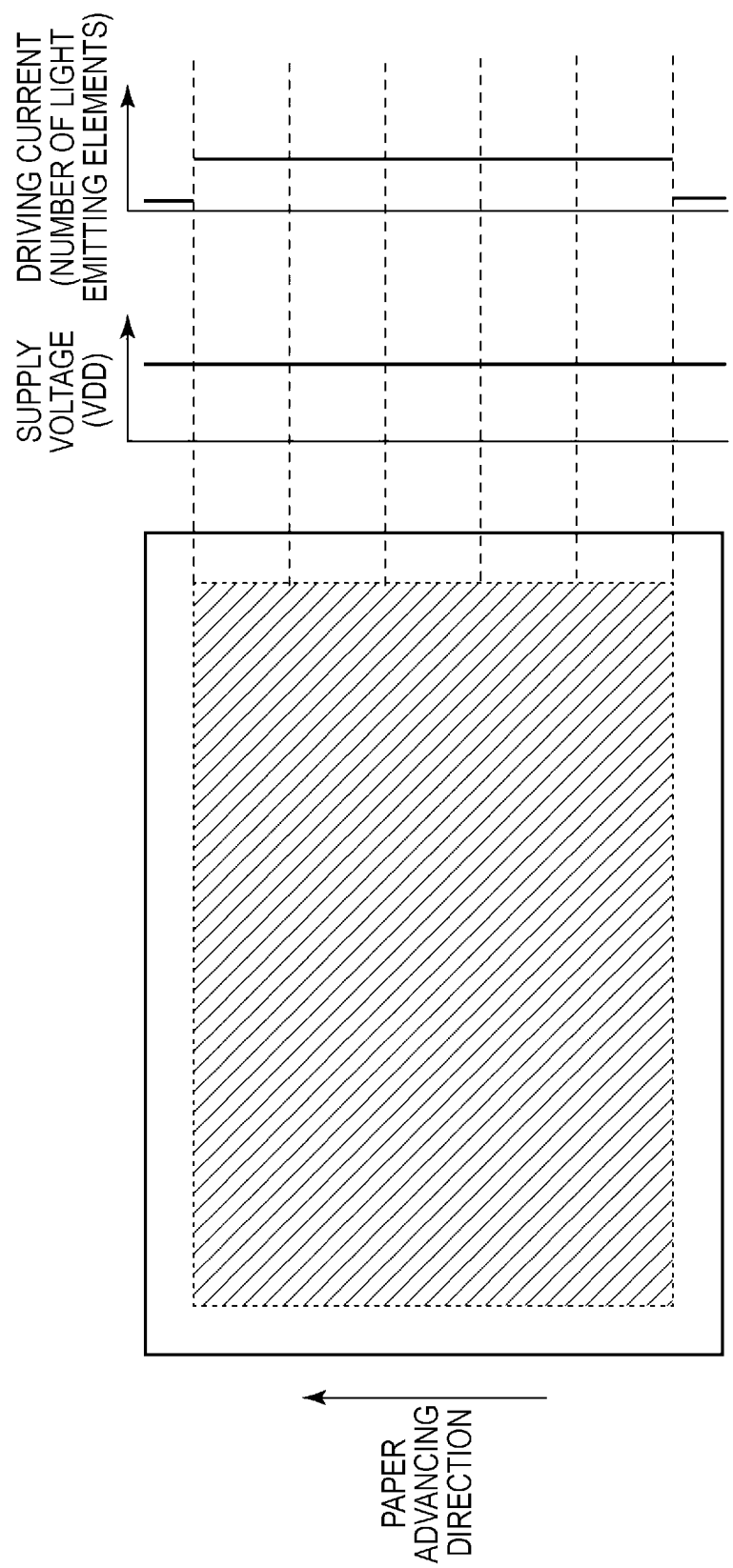
FIG. 13 is a diagram illustrating an example of a relationship between a halftone image (when the number of light emitting elements that emit light is constant) formed by the image forming apparatus according to the embodiment, and a voltage and a driving current supplied to the print head in response to the formation of the halftone image.

FIG. 13 illustrates an example of a relationship between a halftone image (when the number of light emitting elements that emit light is constant) formed by the image forming apparatus according to the embodiment, and a voltage and a driving current supplied to the print head in response to the formation of the halftone image.

As illustrated in FIG. 13, in forming each image line, when the number of light emitting elements 131 that emit light constantly transitions, the driving current supplied to the print head 1 constantly transitions. When the driving current constantly transitions, the voltage supplied to light emitting element 131 also constantly transitions, and does not change in units of lines. When the voltage supplied to the light emitting element 131 constantly transitions, the light emitting element 131 emits a constant quantity of light. When the light emitting element 131 emits a constant quantity of light, the image density is constant in each image line (the density does not change in the sub-scanning direction). Furthermore, the light quantity changes in the main scanning direction, but as described above, the change rate is extremely smooth, and a level that cannot be recognized as a density difference is achieved.

Figure 14:
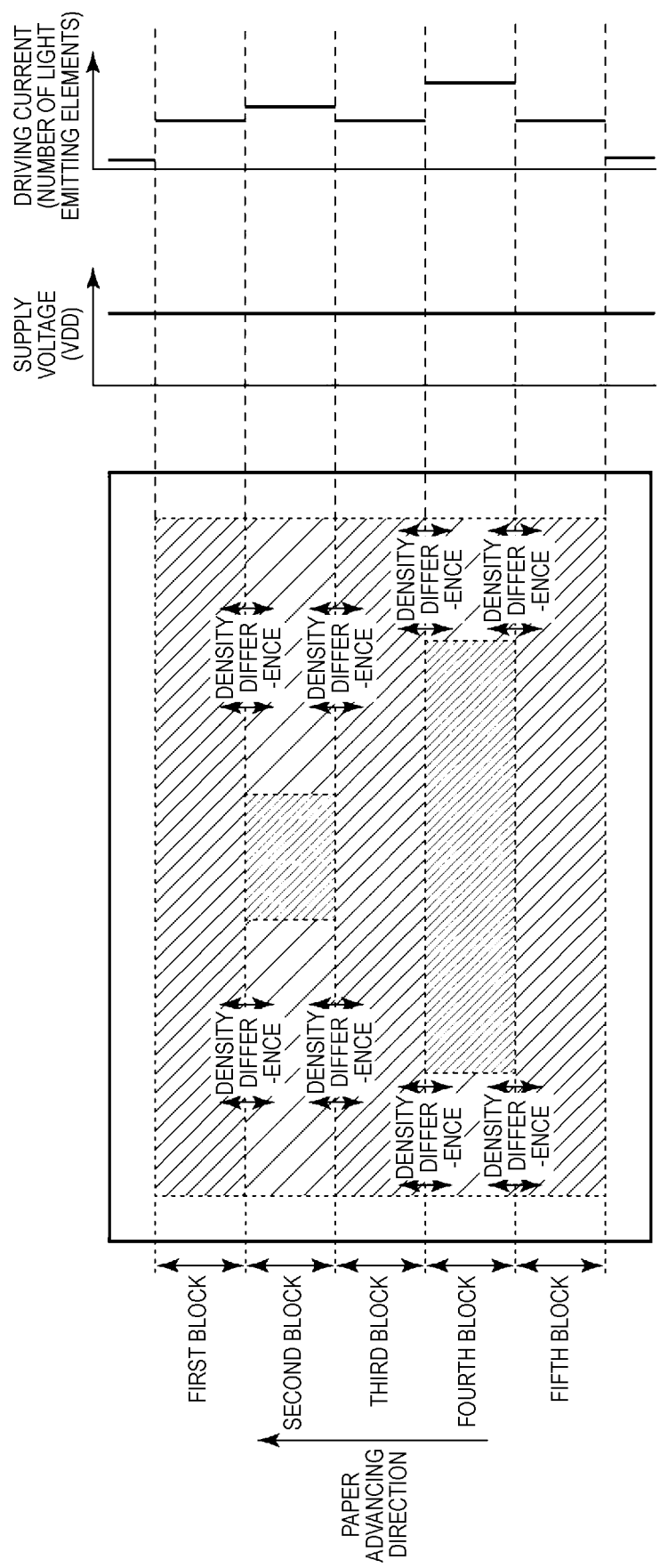
FIG. 14 is a diagram illustrating a non-application example of the driving voltage control according to the embodiment.

FIG. 14 is a non-application example of the driving voltage control according to the embodiment, and illustrates an example of a relationship between a halftone image (when the number of light emitting elements that emit light is not constant depending on the block) formed by the image forming apparatus, and a voltage and a driving current supplied to the print head in response to the formation of the halftone image. In addition, FIG. 14 illustrates a case where the sub-scanning direction is divided into five blocks including first to fifth blocks, and the same image represents each block in order to make the description easy to understand. The halftone images of the first, third, and fifth blocks in FIG. 14 are the same as the halftone image in FIG. 13. In the second and fourth blocks, a solid black image with a high printing rate is disposed at the center portion of the halftone image of FIG. 13, and a solid black area of the fourth block is greater than a solid black area of the second block.

As illustrated in FIG. 14, in forming each block image, the second and fourth blocks have a solid black part at the center portion thereof. Therefore, the number of light emitting elements 131 that emit light increases and the driving current supplied to the print head 1 increases. When the driving current increases, a voltage drop occurs due to a resistance component of the harness 104 and the wiring in the print head 1, and the driving voltage supplied to the light emitting element 131 decreases. When the driving voltage decreases, the light quantity of the light emitting element 131 decreases. In forming the images of the first, third, and fifth blocks, the numbers of light emitting elements 131 that emit light are the same. Therefore, the light quantities of the light emitting elements 131 are also the same, and the image densities of the first, third, and fifth blocks are the same. In forming the image of the second block, the number of light emitting elements 131 that emit light in correspondence to the solid black at the center portion of the second block increases, and thus the driving current increases. When the driving current increases, the voltage supplied to the light emitting element 131 decreases, and the light quantity of the light emitting element 131 decreases. The halftones of both end portions of the second block are the same as the halftones of the first, third, and fifth blocks, but the light quantity of the light emitting element 131 decreases, and thus the halftone image density of both end portions decreases. Therefore, although the halftone images at both ends of the second block are the same as the halftone images of the first block and the third block, a density difference occurs at a block boundary portion, and the halftones look different. In forming the image of the fourth block, the number of light emitting elements 131 that emit light in correspondence to the solid black at the center portion of the fourth block further increases, and thus the driving current further increases. When the driving current further increases, the voltage supplied to the light emitting element 131 further decreases, and the light quantity of the light emitting element 131 further decreases. The halftones of both end portions of the fourth block are the same as the halftones of the first, third, and fifth blocks and the halftones at both ends of the second block, but the light quantity of the light emitting element 131 further decreases, and thus the halftone image density at both end portions further decreases. Therefore, although the halftone images at both ends of the fourth block are the same as the halftone images of the third block and the fifth block, a larger density difference than that of the second block occurs at the block boundary portion, and the halftones look different.

When the number of light emitting elements 131 that emit light in this manner increases, the light quantity of the light emitting element 131 decreases, the image density decreases, and the density change becomes noticeable at the block boundary in the sub-scanning direction. In addition, the relationship between the light quantity change and the image density change may be reversed depending on the developing method.

Figure 15:
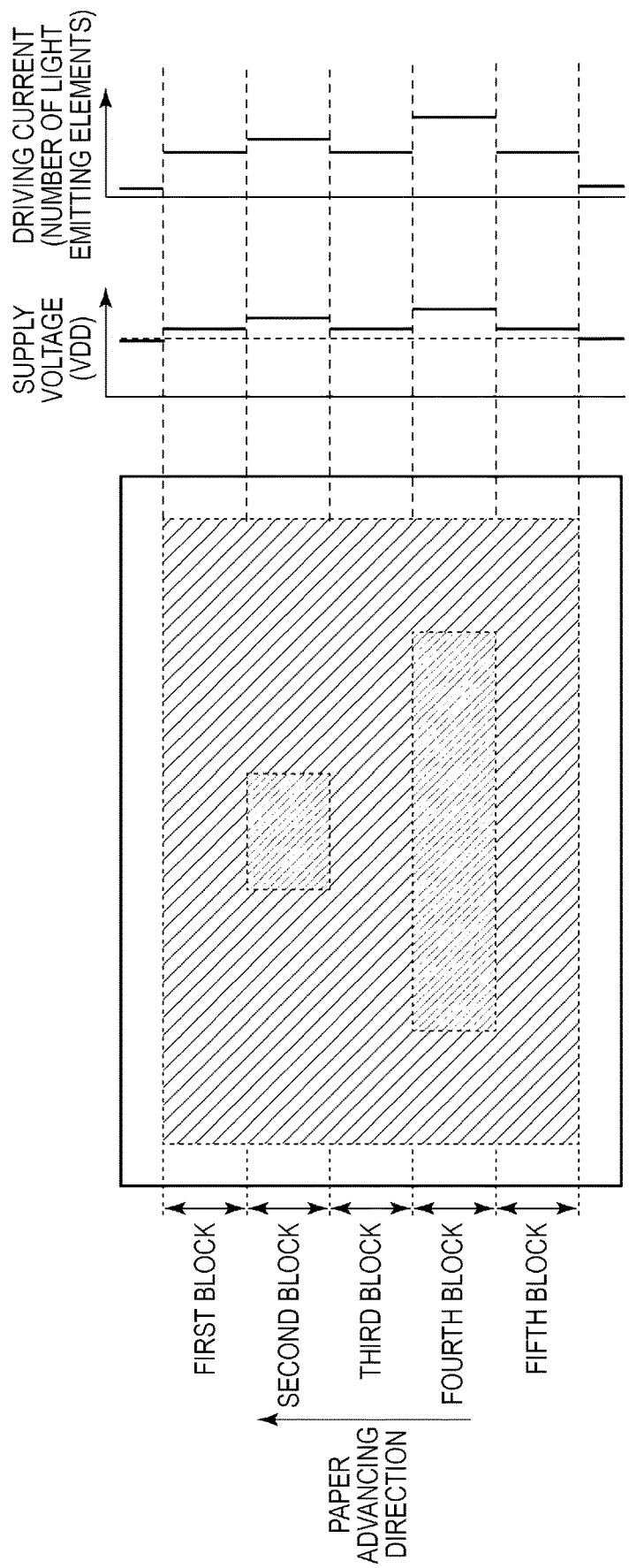
FIG. 15 is a diagram illustrating an application example of the driving voltage control according to the embodiment.

FIG. 15 is an application example of the driving voltage control according to the embodiment, and illustrates an example of a relationship between a halftone image (when the number of light emitting elements that emit light is not constant depending on the block) formed by the image forming apparatus, and a voltage and a driving current supplied to the print head in response to the formation of the halftone image.

As illustrated in FIG. 15, in forming each image line, the driving voltage controller 1832 changes the voltage supplied to the print head 1 according to the number of light emitting elements 131 that emit light. In forming each image line, when the number of light emitting elements 131 that emit light is large, the driving voltage controller 1832 increases the voltage to be supplied, and compensates for the voltage drop that occurs in a wiring resistor due to the increased current. When the voltage decrease is suppressed, the light quantity decrease is suppressed (the light quantity difference is suppressed to be equal to or less than 3%), and the density fluctuation can be made inconspicuous.

For example, in forming the images of the first, third, and fifth blocks, when the proportion of the light emitting elements 131 that emit light exceeds 20% and is equal to or less than 40%, the driving voltage controller 1832 changes the driving voltage to a driving voltage which is higher than the reference voltage by 2%. In forming the image of the second block, when the proportion of the light emitting elements 131 that emit light exceeds 40% and is equal to or less than 60%, the driving voltage controller 1832 changes the driving voltage to a driving voltage which is higher than the reference voltage by 4%. In forming the image of the fourth block, when the proportion of the light emitting elements 131 that emit light exceeds 80%, the driving voltage controller 1832 changes the driving voltage to a driving voltage which is higher than the reference voltage by 8%.

Figure 16:
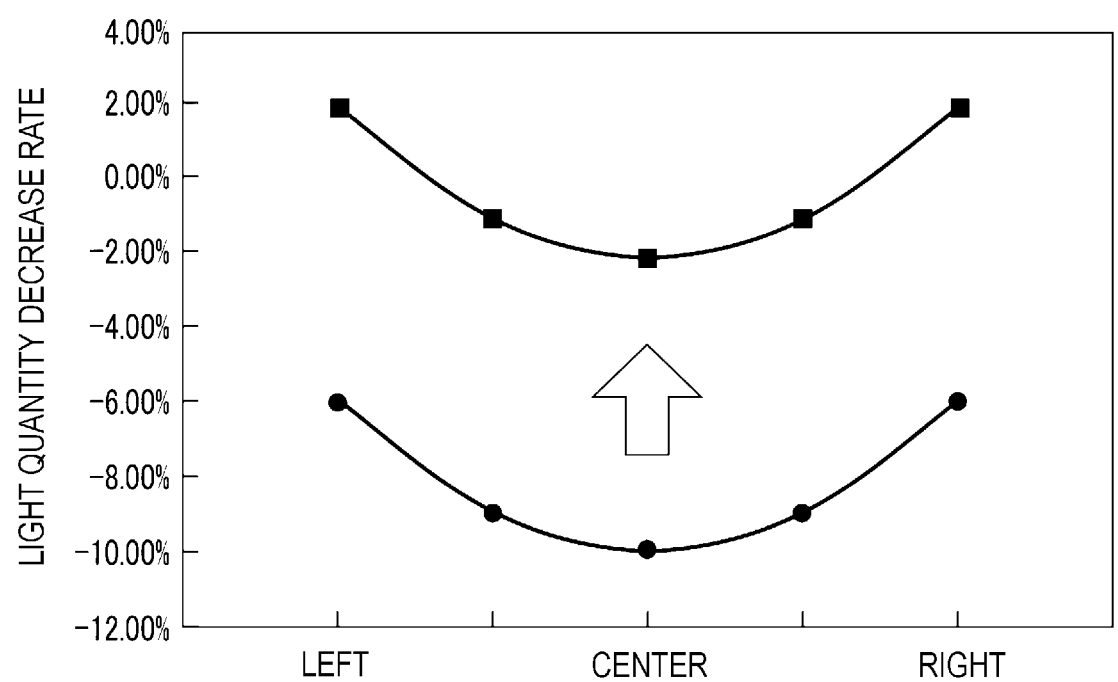
FIG. 16 is a diagram illustrating an example of an effect of suppressing a light quantity decrease due to an increase in voltage applied to the optical head of the image forming apparatus according to the embodiment.

FIG. 16 illustrates an example of an effect of suppressing the light quantity decrease due to an increase in voltage applied to the optical head of the image forming apparatus according to the embodiment. By controlling the driving voltage, the effect illustrated in FIG. 16 is obtained.

FIG. 16 illustrates an example in which the driving voltage is changed to a driving voltage which is higher than the reference voltage by 8% when the lighting rate of the light emitting elements 131 having the largest light quantity decrease rate is 80% (refer to FIG. 12). When the driving voltage is the reference voltage, the light quantity decrease occurs by approximately 6% at the end portion and approximately 10% at center portion of the print head 1. (same as FIG. 12)

On the other hand, when the driving voltage is changed to a voltage which is higher than the reference voltage by 8%, the light quantity becomes +2% at the end portion and −2% at the center portion of the print head 1 as illustrated in FIG. 16. At an intermediate position between the end portion and the center portion, the light quantity becomes ±0%. As the driving voltage controller 1832 controls the driving voltage according to the lighting rate (the number of elements that emit light) of the light emitting elements 131, the light quantity falls within a predetermined range (±3%) with respect to the reference light quantity (0%), and it is possible to prevent the occurrence of a density difference.

Here, an application example of control with respect to the lighting rate of 80% is illustrated, but the same effect can be obtained in control with respect to other lighting rates. Further, the control panel 179 may set application or non-application of the driving voltage control according to the input of application or non-application of the driving voltage control. The non-volatile memory 177 stores the setting of application or non-application of the driving voltage control. When the application of the driving voltage control is set, the controller 174 and the light emission controller 183 detect the number of light emitting elements 131 that emit light, and changes the driving voltage according to the proportion of the number of light emitting elements 131 that emit light. When the non-application of the driving voltage control is set, the controller 174 and the light emission controller 183 do not execute the driving voltage control according to the proportion of the number of the light emitting elements 131 that emit light. When the driving voltage control is applied, it is possible to prevent the light quantity decrease as illustrated in FIG. 12 and the image quality deterioration as illustrated in FIG. 14. In addition, a power consumption amount can be suppressed by not applying the driving voltage control.

Figure 17:
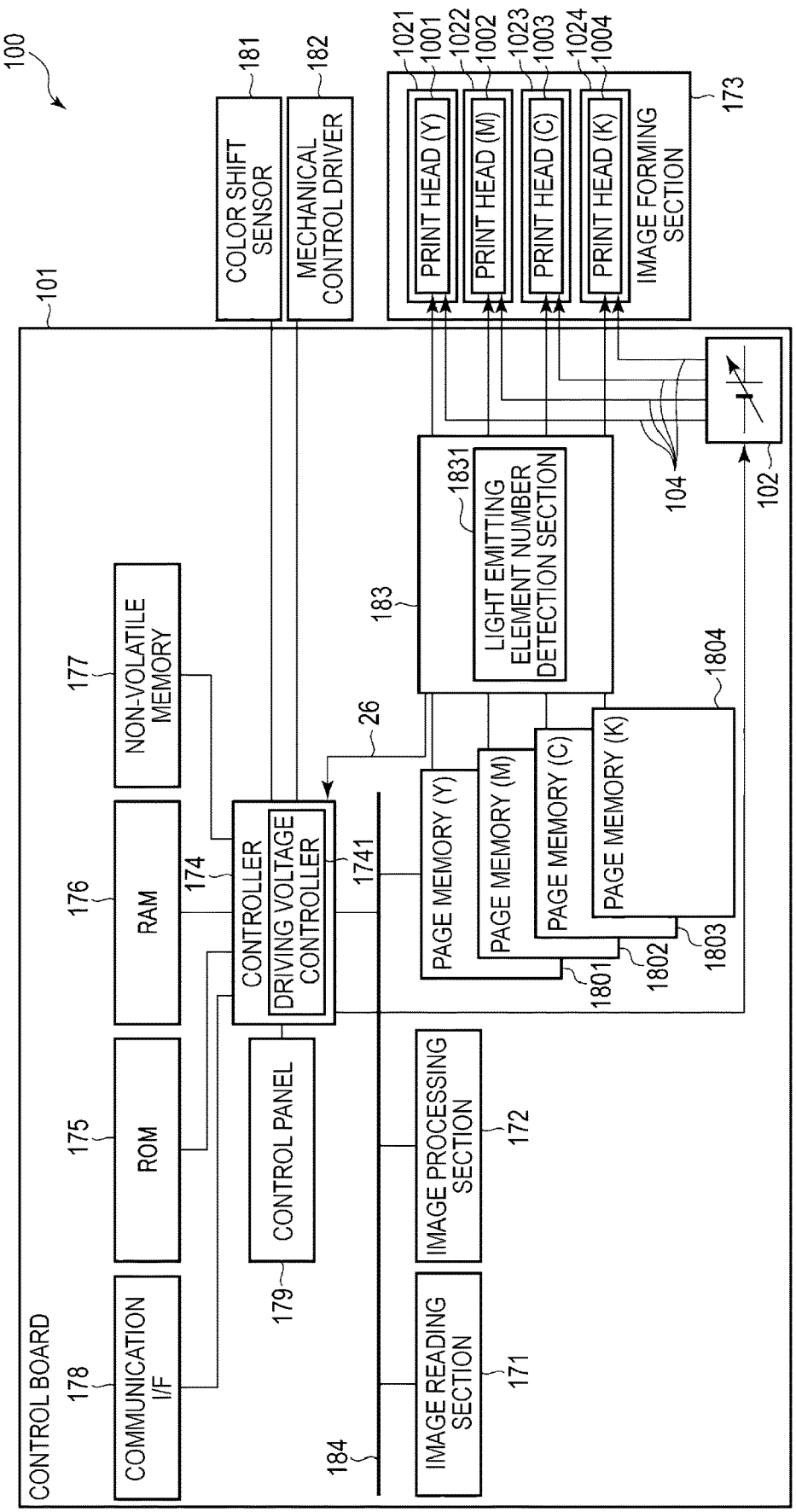
FIG. 17 is a block diagram illustrating a modification example of the control system of the image forming apparatus according to the embodiment.

FIG. 17 is a block diagram illustrating a modification example of the control system of the image forming apparatus according to the embodiment. In the control system of the image forming apparatus illustrated in FIG. 10, the light emission controller 183 includes the driving voltage controller 1832 which controls the driving voltage of the print head, but the control system of the image forming apparatus illustrated in FIG. 17 is different in that the controller 174 includes a driving voltage controller 1741. In the control system of the image forming apparatus illustrated in FIG. 17, the light emitting element number detection section 1831 detects the number of light emitting elements 131 that emit light according to the image data before the light emitting element 131 emits light according to the image data, and outputs the detection result to the driving voltage controller 1741. The driving voltage controller 1741 controls the driving voltage for driving the light emitting element 131 based on the detection result from the light emitting element number detection section 1831. In addition, the driving voltage control described in the embodiment is applicable to both a monochrome image forming apparatus having a single print head and a color image forming apparatus having each print head corresponding to each color. Further, a case where the light emitting element number detection and the driving voltage control are realized by software was described, but the light emitting element number detection and the driving voltage control may be realized by hardware.

The above-described image forming apparatus according to the embodiment can suppress the image quality deterioration by increasing the driving voltage according to the increase rate of the number of light emitting elements that emit light when the number increases corresponding to each image line.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An image forming apparatus comprising:
    a plurality of light emitting elements arranged in at least one row;
    a detector configured to detect a number of light emitting elements that emit light according to image data;
    a controller configured to control a driving voltage for driving the light emitting elements based on the number of light emitting elements detected; and
    an image forming unit configured to form an image based on light emission of the light emitting elements according to the image data.

2. The image forming apparatus of claim 1, wherein the light emitting elements are arranged in a plurality of rows.

3. The image forming apparatus of claim 2, wherein:
    the detector is configured to detect a proportion of the light emitting elements that emit light in units of one or more of the rows; and
    the controller is configured to change the driving voltage based on the proportion.

4. The image forming apparatus of claim 3, wherein the controller is configured to change the driving voltage from a reference voltage to a first voltage higher than the reference voltage when the proportion exceeds a first threshold.

5. The image forming apparatus of claim 4, wherein the controller is configured to change the driving voltage from the reference voltage to a second voltage higher than the first voltage when the proportion exceeds a second threshold higher than the first threshold.

6. The image forming apparatus of claim 4, wherein the controller is configured to set the driving voltage to the reference voltage when the proportion is equal to or less than the first threshold.

7. The image forming apparatus of claim 1, wherein the detector is configured to detect the number of light emitting elements that emit light according to the image data before the light emitting elements emit light.

8. An image forming apparatus comprising:
- a plurality of print heads, each of the print heads configured to include a plurality of light emitting elements arranged in at least one row, each of the print heads corresponding to a color;
- a detector configured to detect a number of light emitting elements that emit light according to image data corresponding to a color for each of the print heads;
- a controller configured to control a driving voltage for driving the light emitting elements based on the number of light emitting elements that emit light in each of the print heads; and
- an image forming unit configured to form an image based on light emission of the print heads according to the image data.

9. The image forming apparatus of claim 8, wherein:
- the detector is configured to detect a proportion of the light emitting elements that emit light in units of one or more of the at least one row; and
- the controller is configured to change the driving voltage based on the proportion.

10. The image forming apparatus of claim 9, wherein the controller is configured to change the driving voltage from a reference voltage to a first voltage higher than the reference voltage when the proportion exceeds a first threshold.

11. The image forming apparatus of claim 10, wherein the controller is configured to change the driving voltage from the reference voltage to a second voltage higher than the first voltage when the proportion exceeds a second threshold higher than the first threshold.

12. The image forming apparatus of claim 10, wherein the controller is configured to set the driving voltage to the reference voltage when the proportion is equal to or less than the first threshold.

13. The image forming apparatus of claim 8, wherein the detector is configured to detect the number of the light emitting elements that emit light according to the image data before the light emitting elements emit light.

14. A light emitting control system for an image forming apparatus, the light emitting control system comprising:
- a plurality of light emitting elements arranged in at least one row;
- a detector configured to detect a number of light emitting elements that emit light according to image data; and
- a controller configured to control a driving voltage for driving the light emitting elements based on the number of light emitting elements detected.

15. The light emitting control system of claim 14, wherein the light emitting elements are arranged in a plurality of rows.

16. The light emitting control system of claim 15, wherein:
- the detector is configured to detect a proportion of the light emitting elements that emit light in units of one or more of the rows; and
- the controller is configured to change the driving voltage based on the proportion.

17. The light emitting control system of claim 16, wherein the controller is configured to change the driving voltage from a reference voltage to a first voltage higher than the reference voltage when the proportion exceeds a first threshold.

18. The light emitting control system of claim 17, wherein the controller is configured to change the driving voltage from the reference voltage to a second voltage higher than the first voltage when the proportion exceeds a second threshold higher than the first threshold.

19. The light emitting control system of claim 17, wherein the controller is configured to set the driving voltage to the reference voltage when the proportion is equal to or less than the first threshold.

20. The light emitting control system of claim 14, wherein the detector is configured to detect the number of the light emitting elements that emit light according to the image data before the light emitting elements emit light.

* * * * *